Patented Jan. 15, 1929.

1,698,793

UNITED STATES PATENT OFFICE.

HEINRICH HEIMANN, OF DESSAU, GERMANY, ASSIGNOR TO I. G. FARBENINDUSTRIE AKTIENGESELLSCHAFT, OF FRANKFORT, GERMANY.

ARTIFICIAL FERTILIZER.

No Drawing. Application filed August 27, 1921, Serial No. 496,188, and in Germany January 29, 1918.

I have filed applications in Germany, January 29, 1918, Patent No. 372,065; Czechoslovakia, July 3, 1920, Patent No. 14,563; Italy, June 7, 1920, Patent No. 532/5; Sweden, June 23, 1920, Patent No. 54,379; Norway, June 23, 1920, Patent No. 33,787; France, June 23, 1920, Patent No. 517,695; England, June 28 and 29, 1920, Patents Nos. 146,259 and 145,582; Japan, July 9, 1920, Patent No. 59,629; and Canada, December 14, 1920, Patent No. 206,568.

By this invention artificial fertilizers which do not cake and can therefore be easily distributed, are obtained by treating hot ammonium nitrate containing water with other inorganic salts.

This mode of production has many advantages. It is unnecessary to separate the solid salts by crystallization and to dry them. The solutions of the salts do not need to be evaporated, so that losses by decomposition of the ammonium salts and destruction of the apparatus are avoided. The heat disengaged by crystallization is sufficient to evaporate the water present. In this manner a mixture of fertilizing salts is produced which, after milling, does not cake and can be distributed directly.

The following examples illustrate the invention, without limiting it, the parts being by weight:

1. 1000 parts of potassium chloride are heated to a high temperature, for instance 300° C. The hot salt is mixed with a hot solution of 1000 parts of ammonium nitrate of 85 per cent strength. After a short time the reaction occurs, water evaporates and the mixture hardens. The product is then milled; it contains only 1 to 3 per cent of water.

Instead of potassium chloride sylvine, sylvinite, carmallite or another fertilizing salt can be used.

2. 1000 parts of a solution of ammonium nitrate of 88 per cent strength heated to 130° C. are mixed with 1000 parts of potassium sulphate. In a short time a paste is formed which becomes hard by evaporation of water. The product is milled and can be distributed directly.

3. 1000 parts of ammonium nitrate of 88 per cent strength heated to 130° C. are mixed with 1100 parts of ammonium sulphate. The mass in a short time becomes pasty and then hard, the water being evaporated for the most part. The fertilizer produced is milled.

Now what I claim is,—

1. A process for manufacture of dry, noncaking artificial fertilizers, consisting in mixing hot ammonium nitrate containing water with other inorganic fertilizing salts.

2. A process for manufacture of dry, noncaking artificial fertilizers, consisting in mixing hot ammonium nitrate containing water with potassium salts which are not injurious to plant life.

3. A process for producing a compound, nondeliquescent fertilizer, consisting in mixing together inorganic fertilizing salts and a hot concentrated aqueous solution of ammonium nitrate and recovering the mixed salt in its solid phase by evaporating water by means of heat contained in the mixture.

4. A process for producing a compound, nondeliquescent fertilizer consisting in mixing together inorganic salts which are not poisonous to plan life and a hot concentrated aqueous solution of ammonium nitrate and recovering the mixed salt in its solid phase by evaporating water by means of heat contained in the mixture.

5. A process for producing a compound, non-deliquescent fertilizer consisting in mixing together alkali metal salts and a hot concentrated aqueous solution of ammonium nitrate and recovering the mixed salt in its solid phase by evaporating water by means of heat contained in the mixture.

6. A process for producing a compound, non-deliquescent fertilizer consisting in mixing together potassium salts and a hot concentrated aqueous solution of ammonium nitrate and recovering the mixed salt in its solid phase by evaporating water by means of heat disengaged by crystallization.

7. A process for producing a compound, non-deliquescent fertilize rconsisting in mixing together potassium chloride and a hot concentrated aqueous solution of ammonium nitrate and recovering the mixed salt in its solid phase by evaporating water by means of heat disengaged by crystallization.

8. The process of making a relatively non-hygroscopic mixed salt from two single salts one of which is highly deliquescent, which consists in forming a mixture of such component salts in the presence of sufficient water to completely dissolve the highly deliquescent salt only, effecting a double decomposition reaction between such salts and recovering the resultant mixed salt in its solid phase from the mixture.

9. The process of making a mixed salt, which consists in forming a mixture of ammonius nitrate and potassium chloride in the presence of insufficient water to effect the complete solution of both salts but sufficient to dissolve the ammonium nitrate, effecting double decomposition between such salts and recovering the resultant mixed salt in its solid phase from the mixture.

In testimony whereof I have affixed my signature.

HEINRICH HEIMANN.